UNITED STATES PATENT OFFICE.

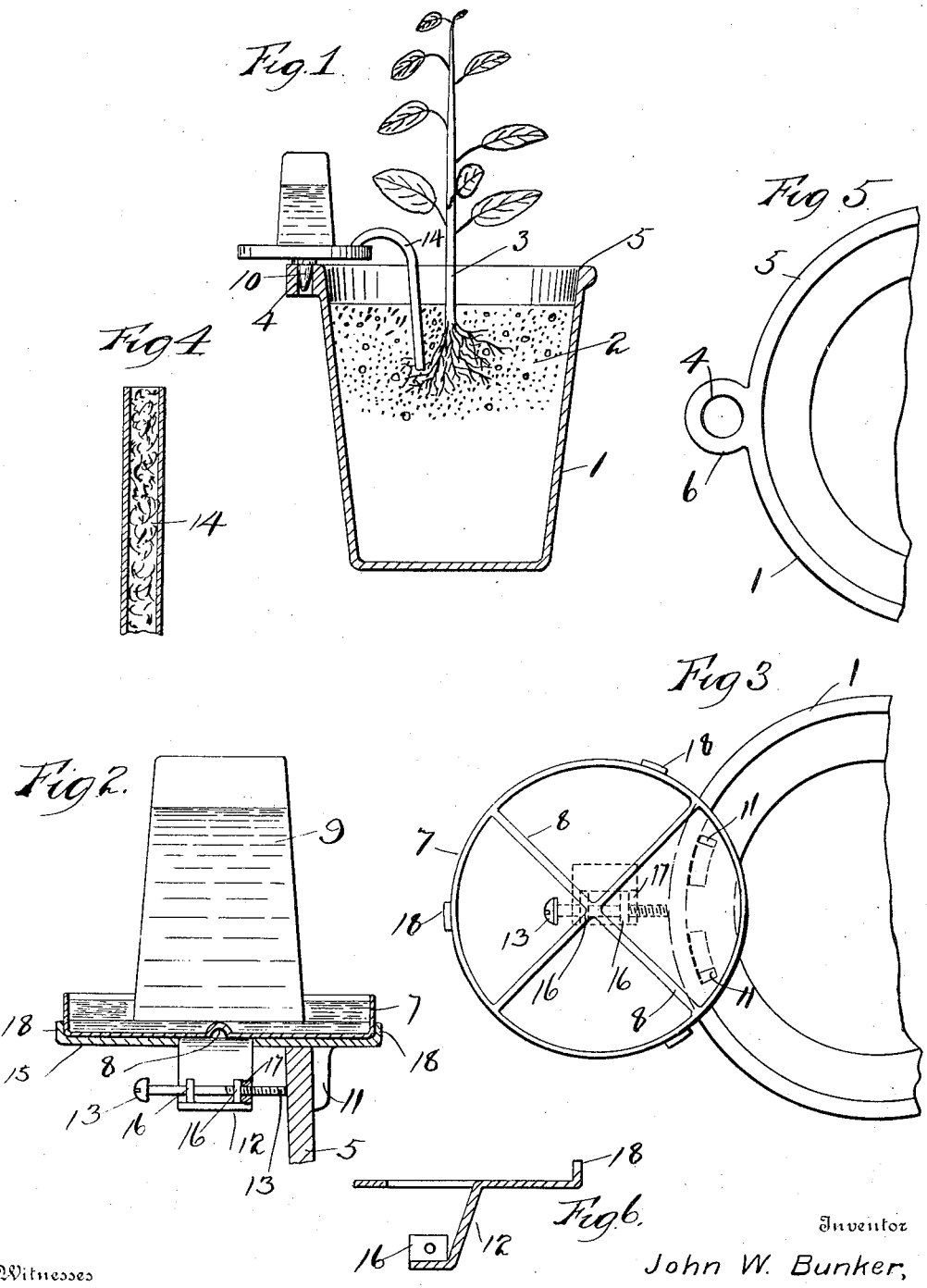

JOHN WALLACE BUNKER, OF PROVIDENCE, RHODE ISLAND, ASSIGNOR TO PROVIDENCE PLANT IRRIGATOR COMPANY, A CORPORATION OF MAINE.

IRRIGATING DEVICE.

No. 880,968.  Specification of Letters Patent.  Patented March 3, 1908.

Application filed July 10, 1907. Serial No. 383,127.

*To all whom it may concern:*

Be it known that I, JOHN WALLACE BUNKER, a citizen of the United States, residing at the city of Providence, in the county of Providence and State of Rhode Island, have invented certain new and useful Improvements in Irrigating Devices, of which the following is a specification, reference being had therein to the accompanying drawing.

My invention relates to the irrigation of plants, and has for its object to provide a simple and effective means whereby a plant may be properly moistened with the required quantity of water and at regular intervals.

A further object of the invention is to provide means whereby the impurities of the air of the room, in which the plant may be located, may be absorbed by the water and fed to the plant.

In some cases plants have been watered through the bottom of the pot, but this method is unnatural and is found to be injurious to the health of the plant, as the roots are thus forced to grow downward to seek the moisture, causing what is known as deep rooting, which tends to sap the strength and vitality of the plant.

An essential feature of my device is that the water is fed by capillary attraction through the surface of the soil (which is the natural way of watering), thereby placing the moisture directly where it is required which allows the ends of the roots to naturally form themselves into receiving cells about the end of the supply to absorb and retain the moisture and receive the maximum amount of benefit therefrom.

Another feature of the invention is my arrangement whereby the reservoir and feed vessel may be attached to and supported by the rim of the flower pot.

With these and other objects in view the invention consists of certain novel features which will be more fully described and then particularly pointed out in the appended claims.

In the accompanying drawings: Figure 1— is an elevation of a plant in a flower pot showing the latter in section and supporting on its rim an irrigating reservoir for supplying moisture to the roots of the plant. Fig. 2— is an enlarged view illustrating my special form of reservoir for supplying water to the plant, also showing special means for attaching the feed vessel to the rim of the pot. Fig. 3— is a top view illustrating the arrangement of the lugs and the binding screw by which this pan is secured to the edge of the pot. Fig. 4— is an enlarged view of the feed tube showing its construction. Fig. 5—is a top view of a portion of a flower pot showing a boss on its rim which is adapted to receive and retain the bracket which supports the irrigating reservoir. Fig. 6— is a section showing the bracket for receiving the binding screw.

Referring to the drawings at 1 is the flower pot which may be of any desired size or shape and is partially filled with earth 2 in which the plant 3 is located. A boss 4 may be formed on the rim 5 of this pot, said boss being provided with an aperture 6. The feed vessel 7 is constructed preferably in the form of a shallow dish, the bottom of which on its inside is preferably provided with raised portions or ribs 8—8. These ribs may be formed if desired, by forcing inward the bottom of the dish, in the manner shown in Fig. 2, or any other convenient means may be employed for preventing the reservoir 9 from engaging the bottom of the pan all around its lower edge. This reservoir may be an inverted tumbler, or any other suitable water receptacle, closed at its upper end and open at its lower end, which rests on said ribs 8—8 whereby the contents of the inverted reservoir may flow out as fast as required.

In order to provide a simple and convenient means for attaching this pan and reservoir to the flower pot I have provided a downwardly extending pin or projection 10 adapted to fit into the aperture 6 in the rim of the pot. The water from this pan or vessel is conducted at regular intervals and distributed in the desired quantities to the roots of the plant through a tube 14 This tube is preferably constructed of non-absorbent material, such as rubber, or the like, and is packed with a filling of absorbent material, such as cotton and the like, forming a wick by means of which any desired amount of moisture, which may be regulated by the use of pipes of different sizes, may be conducted from the reservoir to the plant, but I do not confine myself to this particular construction for conducting the water as any suitable means may be employed for this purpose. As another means of attaching this pan to the pot I have shown the modified form illustrated in Fig. 2 in which there is shown an auxiliary plate 15 having three upwardly turned fingers 18—18 to receive and retain the vessel. At 11—11 are two downwardly projecting ears punched from the stock through the bottom of the same. These ears are adapted to be passed over the rim into the inside of the pot. A third and broader ear 12 is also punched downward from the bottom of the plate, the side edges of which are raised forming lips 16—16 through which the binding screw 13 may be threaded, if desired, or a threaded nut 17 may be placed on the binding screw and held in position from turning by coming in contact with the said ear 12 whereby the whole may be set up to firmly support the vessel and reservoir in position on the edge of the pot.

The operation of the invention may be more particularly described as follows: A reservoir 9 filled with water is inverted into the feed vessel 7, the lower edge of said reservoir resting on the raised portions 8—8 allows a certain quantity of the water to flow from the reservoir into the pan until said pan is practically full, thereby sealing the receptacle and forming a partial vacuum in the upper end thereof. One end of the water conducting tube 14 is placed in the said pan while the other end is inserted by any suitable means into the earth near the roots of the plant, and through this tube the water may be fed drop by drop at regular intervals and in equal quantities to the plant through the top of the soil, thus enabling said plant to properly digest the earth by means of this water, as a man would digest food by means of saliva. The water thus conducted enters the earth surrounding the plant from the surface enabling the same to be supplied to all parts of the earth in the pot in such manner as the plant desires for its best nourishment. Instead of forcing the plant to seek the water, the water will seek the roots of the plant which will be fed to the same in proper quantities and at regular intervals. As the water is in this way drawn from the feed vessel the outside air is caused to pass to the top of the reservoir through the water being drawn therein by means of the vacuum to take the place of the water which is being fed from the vessel. In this way any poisonous air which comes in contact with the water is drawn into the same and is given out as fertilizing properties to the plant.

One of the vital features of the invention is that the water is fed to the plant at a perfectly uniform rate both in time and quantity, which is vital to the healthy growth of the same. This important result is accomplished by means of the reservoir which automatically keeps the water in the said feed vessel at a constant level.

My device is extremely simple and inexpensive in its construction and very effective in its operation and by its use delicate and sensitive plants, which ordinarily wither and die when potted and kept indoors may be made to thrive and flourish and even be retained in the sick room to the pleasure and comfort of the patient.

Having thus described my invention, what I claim as new and desire to secure by Letters Patent, is:

1. In an irrigating device, a shallow pan or vessel, an open mouthed jar adapted to be filled with water and inverted in said pan, means for providing a space between the lower edge of the jar and the bottom of the pan whereby the contents may flow from said jar to the pan as fast as drawn from the latter, and means for feeding the water from said pan to a plant in predetermined quantities.

2. In an irrigating device, a shallow pan or vessel, an open mouthed jar adapted to be filled with water and inverted in said pan, means for providing a space between the lower edge of the jar and the bottom of the pan whereby the contents may flow from the jar to the pan as fast as drawn from the latter, and a wick for feeding the water from said pan to a plant.

3. In an irrigating device, a shallow pan or vessel, an open mouthed jar adapted to be filled with water and inverted in said pan, ribs on said pan on which the jar sits for providing a space between the lower edge of the jar and the bottom of the pan whereby the contents may flow from the jar to the pan as fast as drawn from the latter, and a wick for feeding the water from said pan to a plant.

4. In an irrigating device, a vessel, a reservoir communicating with said vessel, a pot or receptacle in which a plant is set, means for supporting said vessel on said pot, the upper end of said reservoir being hermetically sealed whereby the pressure of air prevents the water from being drawn from the reservoir only as fast as the same is drawn from the vessel, and a wick for feeding the water from said vessel to the plant.

5. In an irrigating device, a vessel, a reservoir, means whereby the water will automatically flow from said reservoir to maintain a constant level in said vessel, a pot or receptacle in which the plant is set, means for supporting said vessel on said pot, and a wick contained within a rubber tube for feeding the water from said vessel to the plant by capillary attraction, substantially as described.

6. In an irrigating device, a vessel, a reservoir, means whereby the water will automatically flow from said reservoir to maintain a constant level in said vessel, a pot or receptacle in which the plant is set, a bracket, means for clamping said bracket to said pot for supporting said vessel on said pot, and a wick for feeding the water from said vessel to the plant, substantially as described.

7. In an irrigating device, a vessel, a reservoir communicating with said vessel, a pot or receptacle in which a plant is set, a removable bracket for supporting said vessel and reservoir on said pot, the upper end of said reservoir being hermetically sealed whereby the pressure of air prevents the water from being drawn from the reservoir only as fast as the same is drawn from the vessel, and a wick for feeding the water from said vessel to the plant.

8. An irrigating device comprising a water reservoir closed at its upper end and open at its lower end, a vessel, the lower end of said reservoir being adapted to rest in said vessel whereby the water is kept at a constant level in the latter, a pot or receptacle in which the plant is set, a bracket adapted to be secured to the pot for supporting said vessel on said pot, and means for feeding the water from said vessel to a plant through the soil above its roots by capillary attraction.

9. In an irrigating device, a vessel, a reservoir, means whereby the water will automatically flow from said reservoir to maintain a constant level in said vessel, a pot or receptacle in which the plant is set, means for supporting said vessel on said pot, and means for feeding said water from said vessel to a plant through the soil above the roots by capillary attraction, substantially as described.

10. An irrigating device comprising a water reservoir closed at its upper end and open at its lower end, a vessel, the lower end of said reservoir being adapted to rest in said vessel whereby the water is kept at a constant level in the latter, a pot or receptacle in which the plant is set, means for supporting said vessel on said pot, and means for feeding the water from said vessel to a plant through the soil above its roots by capillary attraction.

11. An irrigating device comprising a vessel, raised portions or ribs formed in the bottom of said vessel, a water reservoir closed at its upper end and open at its lower end, said lower end being adapted to rest on said ribs in said vessel whereby the water is kept at a constant level in said vessel, a pot or receptacle in which the plant is set, means for supporting said vessel on said pot, and means for feeding the water from said vessel to a plant through the surface of the soil by capillary attraction.

In testimony whereof I affix my signature in presence of two witnesses.

JOHN WALLACE BUNKER.

Witnesses:
 FRANCIS I. McCANNA,
 FRANCES M. WHEELER.